(12) United States Patent
Yurke

(10) Patent No.: US 12,068,085 B2
(45) Date of Patent: Aug. 20, 2024

(54) ENTANGLEMENT OF EXCITONS BY ACOUSTIC GUIDING

(71) Applicant: Boise State University, Boise, ID (US)

(72) Inventor: Bernard Yurke, Boise, ID (US)

(73) Assignee: Boise State University, Boise, ID (US)

( * ) Notice: Subject to any disclaimer, the term of this patent is extended or adjusted under 35 U.S.C. 154(b) by 324 days.

(21) Appl. No.: 17/447,839

(22) Filed: Sep. 16, 2021

(65) Prior Publication Data

US 2022/0084710 A1     Mar. 17, 2022

Related U.S. Application Data

(60) Provisional application No. 62/706,896, filed on Sep. 16, 2020.

(51) Int. Cl.
    *G21K 1/00*      (2006.01)
    *H04B 10/70*      (2013.01)

(52) U.S. Cl.
    CPC ............... *G21K 1/00* (2013.01); *H04B 10/70* (2013.01)

(58) Field of Classification Search
    CPC .......... G06N 10/00; G06N 10/40; G21K 1/00; H04B 10/70
    See application file for complete search history.

(56) References Cited

U.S. PATENT DOCUMENTS 9,073,962 B2   7/2015   Fracchia et al.
2015/0218204 A1   8/2015   Yin et al.
2017/0190573 A1   7/2017   Shen et al.
2018/0044372 A1   2/2018   Han et al.
2019/0048036 A1   2/2019   Yurke et al.

FOREIGN PATENT DOCUMENTS

WO     2014018675 A1     1/2014

OTHER PUBLICATIONS

Gucker et al, "A Frequency-Modulated Ultrasonic Interferometer: Adiabatic Compressibility of Aqueous Solutions of NACL and KCL at 25 C", Chemistry, vol. 55, pp. 12-19 1966 (Year: 1966).*
Inoue et al, "A New Ultrasonic Interferometer for Velocity Measurement in Liquids Using Optical Diffraction", J. Phys. D: Appl. Phys, vol. 19, pp. 1439-1447 1986 (Year: 1986).*

(Continued)

*Primary Examiner* — David E Smith
(74) *Attorney, Agent, or Firm* — McKee, Voorhees & Sease, PLC

(57) ABSTRACT

A system is described that exhibits the functionality of a beam-splitter, typically an optical device that splits a beam of light in two. In this case, the beams are acoustic pulses and can lead to the creation of a Wannier-Mott exciton: a bound state of an electron and an electron hole whose attraction to each other is maintained by the electrostatic Coulomb force. This exciton beam-splitter is lossy (i.e., involves the dissipation of electrical or electromagnetic energy). Half of the time the exciton is radiated away. Nevertheless, if the exciton is not lost, the exciton is now in a superposition of two states that can be well separated in position. Four such beam-splitters can be used to make an exciton interferometer that uses the interference patterns from the interacting acoustic pulses to extract information.

10 Claims, 4 Drawing Sheets

(56) References Cited

OTHER PUBLICATIONS

Cannon et al., "Large Davydov Splitting and Strong Fluorescence Suppression: An Investigation of Exciton Delocalization in DNA-Templated Holliday Junction Dye Aggregates", Supporting Information, 20 pages, Feb. 8, 2018.
Childs et al., "Universal Computation by Multiparticle Quantum Walk", Science Mag., vol. 339, pp. 791-794, Feb. 15, 2013.
Gucker et al., "A Frequency-Modulated Ultrasonic Interferometer: Adiabatic Compressibility of Aqueous Solutions of NACL and KCL at 25 C", Chemistry, vol. 55, pp. 12-19 1966.
Inoue et al., "A new ultrasonic interferometer for velocity measurement in liquids using optical diffraction", J. Phys. D: Appl. Phys., vol. 19, pp. 1439-1447 1986.
Ke et al., "Three-Dimensional Structures Self-Assembled from DNA Bricks", Science, vol. 338(6111), 16 pages, Nov. 30, 2012.
Wei et al., "Complex shapes self-assembled from single-stranded DNA tiles", Nature, vol. 485, pp. 623-627, May 31, 2012.
Yurke et al., "Passive linear nanoscale optical and molecular electronics device systhesis from nanoparticles", Physical Review A, vol. 81, 9 pages, 2010.

\* cited by examiner

ENTANGLEMENT OF EXCITONS BY ACOUSTIC GUIDING

CROSS REFERENCE TO RELATED APPLICATIONS

This application claims priority under 35 U.S.C. § 119 to provisional patent application U.S. Ser. No. 62/706,896, filed Sep. 16, 2020. The provisional patent application is herein incorporated by reference in its entirety, including without limitation, the specification, claims, and abstract, as well as any figures, tables, appendices, or drawings thereof.

STATEMENT REGARDING FEDERALLY SPONSORED RESEARCH OR DEVELOPMENT

This invention was made with government support under Grant No. DE-AC07-05ID14517/00154754-00015 awarded by U.S. Department of Energy/Battelle Energy Alliance, LLC. The government has certain rights in the invention.

FIELD OF THE INVENTION

The invention relates generally to apparatus(es) and/or corresponding method(s) that have industrial applications in at least the quantum optics and quantum computing industries. More particularly, but not exclusively, the present invention relates to the entanglement of Wannier-Mott excitons by acoustic guiding in interferometers and/or quantum computers.

BACKGROUND OF THE INVENTION

Interferometers are investigative tools already used in many fields of science and engineering. In general, interferometers work by merging two or more sources of electromagnetic waves to create an interference pattern. The interference pattern can then be used to extract information. Interferometers are widely used in science and industry for the measurement of microscopic displacements, refractive index changes and surface irregularities.

In the case with most interferometers, light from a single source is split into two beams that travel in different optical paths. The beans are then combined again to produce interference. Under some circumstances, two incoherent sources can also be made to interfere. The resulting interference fringes give information about the difference in optical path lengths.

In analytical science, interferometers are used to measure lengths and the shape of optical components with nanometer precision. Interferometers have the highest precision length among known measuring instruments. In Fourier transform spectroscopy, interferometers are used to analyze light containing features of absorption or emission associated with a substance or mixture. An astronomical interferometer consists of two or more separate telescopes that combine their signals, offering a resolution equivalent to that of a telescope of diameter equal to the largest separation between its individual elements. Non-exciton interferometers are limited in the interference patterns the non-exciton interferometers can consider and, therefore, in the information the non-exciton interferometers can facilitate extracting.

An exciton is a bound state of an electron and an electron hole which are attracted to each other by the electrostatic Coulomb force. The exciton is an electrically neutral quasiparticle that exists in insulators, semiconductors and some liquids. The exciton is regarded as an elementary excitation of condensed matter that can transport energy without transporting net electric charge.

An exciton can form when a material absorbs a photon of higher energy than its bandgap. This excites an electron from the valence band into the conduction band. In turn, this leaves behind a positively charged electron hole (an abstraction for the location from which an electron was moved). The electron in the conduction band is then less attracted to this localized hole due to the repulsive Coulomb forces from large numbers of electrons surrounding the hole and excited electron. These repulsive forces provide a stabilizing energy balance. Consequently, the exciton has slightly less energy than the unbound electron and hole. The wavefunction of the bound state is said to be hydrogenic, an exotic atom state akin to that of a hydrogen atom. However, the binding energy is much smaller and the particle's size much larger than a hydrogen atom. This is because of both the screening of the Coulomb force by other electrons in the semiconductor, i.e., the relative permittivity, and the small effective masses of the excited electron and hole. The recombination of the electron and hole, i.e., the decay of the exciton, is limited by resonance stabilization due to the overlap of the electron and hole wave functions, resulting in an extended lifetime for the exciton.

The electron and hole may have either parallel or anti-parallel spins. The spins are coupled by the exchange interaction, giving rise to exciton fine structure. In periodic lattices, the properties of an exciton show momentum (k-vector) dependence.

In semiconductors, the dielectric constant is generally large. Consequently, electric field screening tends to reduce the Coulomb interaction between electrons and holes. The result is a Wannier-Mott exciton, which has a radius larger than the lattice spacing. Small effective mass of electrons that is typical of semiconductors also favors large exciton radii. As a result, the effect of the lattice potential can be incorporated into the effective masses of the electron and hole. Likewise, because of the lower masses and the screened Coulomb interaction, the binding energy is usually much less than that of a hydrogen atom, typically on the order of 0.01 eV. Wannier-Mott excitons are typically found in semiconductor crystals with small energy gaps and high dielectric constants, but have also been identified in liquids, such as liquid xenon. Wannier-Mott excitons are also known as large excitons.

Quantum computing is the exploitation of collective properties of quantum states, such as superposition and entanglement, to perform computation. The devices that perform quantum computations are known as quantum computers. There are several types of quantum computers (also known as quantum computing systems), including the quantum circuit model, quantum Turing machine, adiabatic quantum computer, one-way quantum computer, and various quantum cellular automata. The most widely used model is the quantum circuit, based on the quantum bit, or "qubit", which is somewhat analogous to the bit in classical computation. A qubit can be in a 1 or 0 quantum state, or in a superposition of the 1 and 0 states. When the qubit is measured, however, the qubit is always 0 or 1; the probability of either outcome depends on the qubit's quantum state immediately prior to measurement.

Efforts towards building a physical quantum computer focus on technologies such as transmons, ion traps, and topological quantum computers, which aim to create high-quality qubits. These qubits may be designed differently, depending on the full quantum computer's computing model, whether quantum logic gates, quantum annealing, or adiabatic quantum computation. There are currently a number of significant obstacles to constructing useful quantum computers. For example, there can be difficulty in maintaining qubits' quantum states, as they suffer from quantum decoherence and state fidelity. Quantum computers therefore often require error correction. Moreover, the function of quantum computers often critically and detrimentally relies upon the inclusion of complex and expensive semiconductor materials/semiconductors.

A semiconductor material has an electrical conductivity value falling between that of a conductor, such as metallic copper, and an insulator, such as glass. Its resistivity falls as its temperature rises; metals behave in the opposite way. Conducting properties of the semiconducting material may be altered in useful ways by introducing impurities, i.e., doping, into the crystal structure. When two differently doped regions exist in the same crystal, a semiconductor junction is created. The behavior of charge carriers, which include electrons, ions and electron holes, at these junctions is the basis of diodes, transistors and most modern electronics. Some examples of semiconductors are silicon, germanium, gallium arsenide, and elements near the so-called "metalloid staircase" on the periodic table. After silicon, gallium arsenide is the second-most common semiconductor and is used in laser diodes, solar cells, microwave-frequency integrated circuits, and others. Silicon is often a critical element for fabricating most electronic circuits.

The modern understanding of the properties of a semiconductor relies on quantum physics to explain the movement of charge carriers in a crystal lattice. Doping greatly increases the number of charge carriers within the crystal. When a doped semiconductor contains free holes, the doped semiconductor is called "p-type", and when the doped semiconductor contains free electrons, it is known as "n-type". The semiconductor materials used in electronic devices are doped under precise conditions to control the concentration and regions of p- and n-type dopants. A single semiconductor device crystal can have many p- and n-type regions; the p-n junctions between these regions are responsible for the useful electronic behavior. Using a hot-point probe, one can determine quickly whether a semiconductor sample is p- or n-type.

Thus, there exists a need in the art for an apparatus which enables the measurement of the coherence lifetime of Wannier-Mott excitons and for a computer capable of and/or method for acoustically guiding Wannier-Mott excitons with sufficiently long coherence lifetimes to accomplish quantum computation, thereby resulting in significant computational advantages over current semiconductor-based computation approaches.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to extract information from interference patterns. With the exciton-based interferometer described herein, the merging and splitting of acoustic pulses can lead to entangled one-exciton states. This superposition of states is in essence a quantum information system that has the potential to extract significantly more information and enable quantum computation.

It is still yet a further object, feature, and/or advantage of the present invention to impact and control probability of whether an exciton appears at a pre-determined location to further enhance said quantum computation.

The methods of acoustically guiding excitons disclosed herein can be used in a wide variety of applications. For example, these methods can be used to transport surface acoustic waves having excitons.

The methods of acoustically guiding excitons described herein can be incorporated into quantum computing systems, interferometers, and other systems which accomplish some or all of the previously stated objectives.

It is preferred these exciton-based quantum computers and exciton-based interferometers be safe to use, reliable, efficient, cost effective, and durable. For example, all of the materials included in the quantum computer could be configured to safely operate at room temperature. The interferometers described herein should not fail due to excessive and/or prolonged exposure to tensile, compressive, and/or balanced forces acting on the interferometers.

According to some aspects of the present disclosure, a method of manipulating an exciton comprises launching a plurality of inner wave pulses of an elastic medium into one another to cause a first collision; during said first collision, raising the energy of an antisymmetric component of an exciton wave function into a continuum such that the energy is lost from a potential well produced by the elastic medium; launching a plurality of outer waves pulses toward one another to cause: second collisions between the plurality of outer waves and resulting waves from the first collision; a third collision between a subset of waves resulting from the second collisions; and a probability the exciton arrives at one or more predetermined locations based on a phase shift that can occur at a time between the second collisions and third collision; and detecting whether the exciton arrived at the one or more predetermined locations. The second collisions occur after the first collision and the third collision occurs after the second collisions.

Between the second collisions and third collision, a phase shift occurs in one of the split pulses. If the phase shift has a zero value, constructive interference occurs. If the phase shift has a value of $\pi$, a destructive interference occurs. It can be desirable to further control the phase shift to impact said probability. Likewise, it can be further desirable to control the distance between two wells to impact said probability.

The steps can be repeated until the third collision results in a merger where a symmetric exciton mode emerges with no amplitude lost.

According to some additional aspects of the present disclosure, the method can further comprise the exciton with visible light; well separating the exciton in position; allowing the electron and an electron hole to maintain attraction to one another through an electrostatic Coulomb force; dissipating electrical or electromagnetic energy during said splitting and merging of pulses; and/or extracting information from interference by measuring a physical characteristic of sound selected from the group consisting of velocity, wavelength, absorption, impedance, and temperature.

According to some additional aspects of the present disclosure, the elastic medium comprises an acoustic field and the plurality of inner wave pulses and the plurality of outer wave pulses are formed from using ultrasound. The second collisions can comprise two collisions substantially equidistantly spaced from a central location of an interferometer used to carry out the method. The first collision and the third collision can occur at said central location.

According to some additional aspects of the present disclosure, an exciton amplitude of a first inner wave pulse selected from the plurality of wave pulses is non-zero. An exciton amplitude of a second wave pulse selected from the plurality of wave pulses can equal zero. Between the second collisions and the third collision, an exciton amplitude of at least one of the pluralities of inner and outer wave pulses can undergo a phase shift, thereby causing destructive interference. If no phase shifts occur in the plurality of inner and outer wave pulses, constructive interference is caused. In some embodiments, all splitting and merging of pulses can be lossless.

According to some additional aspects of the present disclosure, the plurality of inner wave pulses and/or the plurality of outer wave pulses are launched from the same source and/or have a substantially similar or identical frequency.

According to some other aspects of the present disclosure, a quantum computer can comprise an ultrasonic transducer capable of converting ultrasound into electrical signals and electrical signals into ultrasound, a gas or liquid through which the ultrasound can propagate, a plurality of pulse splitters capable of splitting and merging correlated or coherent acoustic pulses, a visible light source capable of binding excitons created from splitting the correlated or coherent acoustic pulses to visible light, thereby forming exciton-polaritons, and an integrated circuit comprising at least one quantum logic gate that operates on the exciton-polaritons.

According to some additional aspects of the present disclosure, the gas or liquid is kept at room temperature and still permits operation of the quantum computer, the quantum computer is free from qubits, and/or the quantum computer is free from semiconducting materials.

According to some other aspects of the present disclosure, an exciton interferometer comprises a source of mechanical waves, a medium possessing inertia through which the mechanical waves can propagate, a collider capable of splitting and/or merging correlated or coherent pulses, a mechanism capable of binding excitons created as a result of splitting and/or merging the correlated or coherent pulses, and a receiver that converts mechanical energy from the mechanical waves into electrical signals.

According to some additional aspects of the present disclosure, the source of mechanical waves is a vibrating crystal, a reflector is placed parallel to the vibrating crystal, the mechanical waves are longitudinal waves, and/or the correlated or coherent pulses are surface acoustic wave pulses.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 3A is a schematic representation of a phase gate, representing a phase shifter consisting of a modified pulse splitter with two detuned nanoparticles, labeled #and *.

The phase shifter is a two-port network derived from the pulse splitter, shown in FIG. 3B, by replacing the transmission lines of ports 2 and 4 with two chromophores whose resonant frequency is slightly detuned from the rest of the chromophore circuit. The relative coupling strength between the adjacent chromophores is labeled on the corresponding link. FIG. 3B is a schematic representation of a basis-changing gate where the device nodes are labeled with the integers 1 through 4. The transmission line nodes are indicated by pairs of numbers r, m where the first labels the transmission line and the second labels a node along that transmission line. The hopping interaction coupling strengths between pairs of nodes within the device are labeled by $g_n$, where n is 1 or 2. The hopping interaction coupling strengths between neighboring nodes along the transmission lines are all taken to be equal to g. The direction of propagation of the incoming $a_r^{in}$ and outgoing $a_r^{out}$ amplitudes for each of the transmission lines is also indicated.

FIG. 3C is a schematic representation of a controlled basis change gate with a phase shifting element between two basis change gates. The first basis change gate is located in shading in the upper left-hand portion of the figure. The second basis change gate is located in shading in the upper right-hand portion of the figure. The phase shifting element is located in shading in the center of the figure.

Figure 1:
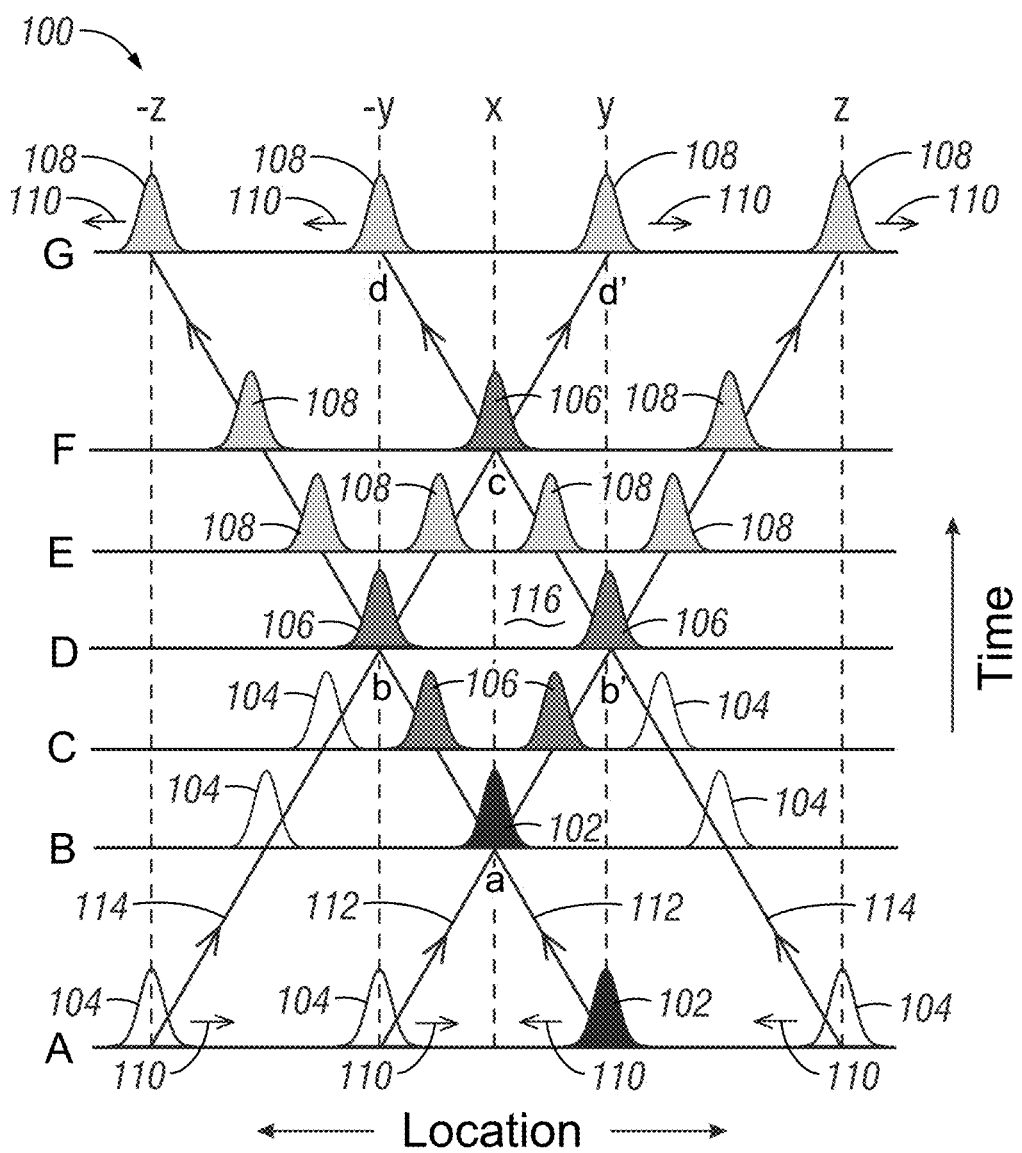
FIG. 1 shows a space-time diagram of colliding acoustic pulses implementing an exciton interferometer for the case of constructive interference.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

One-exciton states can be created by acoustic guiding. Acoustic guiding is governed by the Schrödinger equation. Here, the particular linear partial differential equation defining the wave function of a quantum-mechanical system with two colliding acoustic pulses is:

$$i\hbar \frac{\partial \Psi}{\partial t} = -\frac{\hbar^2}{2m}\frac{\partial^2 \Psi}{\partial x^2} + V(x,t)\Psi,$$

where V (x, t) is the potential produced by said two colliding acoustic pulses. The potential is a function of distance, x, and time, t. ψ is a wave function, h is the reduced Planck constant, i is the imaginary unit, and m is the mass of the particle. The resulting acoustic potential can be modeled as:

$$V(x,t) = V[\delta(x-vt) + \delta(x+vt)],$$

representing two colliding delta function potential wells, where v is the velocity of the acoustic pulse. A delta function potential supports only one bound state.

When the velocity is sufficiently slow so that the system evolves adiabatically (i.e., without transferring heat or mass between the thermodynamic system and its environment), the energy eigenstates, $E_\psi$, can be solved for when the positions of the potential wells are held fixed. That is, one can solve the energy eigenstates of $$i\hbar \frac{\partial \Psi}{\partial t} = -\frac{\hbar^2}{2m}\frac{\partial^2 \Psi}{\partial x^2} - V\delta(x-a)\Psi - V\delta(x+a)\Psi.$$

V is a positive constant. 2a is the distance between the two potential wells. Writing $$\Psi(x,t) = \psi(x)e^{-iEt/\hbar}$$

where e is Euler's number, one obtains $$E\psi = -\frac{\hbar^2}{2m}\frac{\partial^2 \psi}{\partial x^2} - V\delta(x-a)\psi - V\delta(x+a)\psi.$$

when |x|≠a (x is unequal to a and unequal to −a) this equation reduces to $$E\psi = -\frac{\hbar^2}{2m}\frac{\partial^2 \psi}{\partial x^2}$$

writing the eigenstate ψ as:

$$\psi(x) = e^{-\kappa x}.$$

Substituting ψ into the immediately preceding equation yields energy, E:

$$E = -\frac{\hbar^2 \kappa^2}{2m}$$

or $$\kappa^2 = -\frac{2mE}{\hbar^2}$$

For the bound states E is negative, that is, $$E = -|E|.$$

The wave number, κ, can then be solved for as follows:

$$\kappa = \pm\sqrt{\frac{2m|E|}{\hbar^2}}.$$

From this, we conclude that the wave function has the following form $$\psi(x) = \begin{cases} Ae^{\kappa x} & \text{for } x < -a \\ Be^{-\kappa x} + Ce^{\kappa x} & \text{for } -a < x < a, \\ De^{-\kappa x} & \text{for } x > a \end{cases}$$

where K is now taken to be positive. Because the system is symmetric under reflection, the eigenstates must be either symmetric or antisymmetric under reflection along the x axis, that is, under the transformation x→−x. The symmetric eigenstate, $\psi_S$, will thus have the form $$\psi_S(x) = \begin{cases} A_S e^{\kappa_S x} & \text{for } x < -a \\ B_S \cosh(\kappa_S x) & \text{for } -a < x < a. \\ A_S e^{-\kappa_S x} & \text{for } x > a \end{cases}$$

The antisymmetric eigenstate, $\psi_A$, will have the form $$\psi_A(x) = \begin{cases} -A_A e^{\kappa_A x} & \text{for } x < -a \\ B_A \cosh(\kappa_A x) & \text{for } -a < x < a. \\ A_A e^{-\kappa_A x} & \text{for } x > a \end{cases}$$

The wave function must be continuous at x=−a and x=a. This results in the conditions $$A_S e^{-\kappa_S a} = B_S \cosh(\kappa_S a)$$

and $$A_A e^{-\kappa_A a} = B_A \sinh(\kappa_A a)$$

Using these two equations to eliminate $B_S$ and $B_A$ from the equations for $\psi_S(x)$ and $\psi_A(x)$ yields:

$$\psi_S(x) = \begin{cases} A_S e^{\kappa_S x} & \text{for } x < -a \\ A_S e^{-\kappa_S a}\dfrac{\cosh(\kappa_S x)}{\cosh(\kappa_S a)} & \text{for } -a < x < a, \\ A_S e^{-\kappa_S x} & \text{for } x > a \end{cases}$$

and $$\psi_A(x) = \begin{cases} -A_A e^{\kappa_A x} & \text{for } x < -a \\ A_A e^{-\kappa_A a}\dfrac{\sinh(\kappa_A x)}{\sinh(\kappa_A a)} & \text{for } -a < x < a, \\ A_A e^{-\kappa_A x} & \text{for } x > a \end{cases}$$

The constants $A_S$ and $A_A$ are normalization constants which can be fixed by requiring $$\int_{-\infty}^{\infty} |\varphi(x)|^2 dx = 1.$$

Thus, imposing the conditions:

$$-\frac{\hbar^2}{2m}\left[\frac{\partial \psi}{\partial x}\bigg|_{z=-a+\varepsilon} - \frac{\partial \psi}{\partial x}\bigg|_{z=-a-\varepsilon}\right] - V\psi(-a) = 0 \text{ and}$$

$$-\frac{\hbar^2}{2m}\left[\frac{\partial \psi}{\partial x}\bigg|_{z=a+\varepsilon} - \frac{\partial \psi}{\partial x}\bigg|_{z=a-\varepsilon}\right] - V\psi(a) = 0,$$

where one takes the limit ε→0. For the symmetric eigenstate, at x=−a, one obtains from the equations above:

$$\frac{\partial \psi_S}{\partial x}\bigg|_{x=-a+\varepsilon} = -\kappa_S A_S e^{-\kappa_S a}\tanh(\kappa_S a), \frac{\partial \psi_S}{\partial x}\bigg|_{x=-a-\varepsilon} = \kappa_S A_S e^{-\kappa_S a} \text{ and}$$

$$\psi_S(-a) = A_S e^{-\kappa_S a}.$$

Substituting these last three equations into the imposed conditions yields:

$$\frac{\hbar^2 \kappa_S}{2m}[\tanh(\kappa_S a) + 1] = V.$$

which further yields $$\frac{\kappa_S e^{\kappa_S a}}{\cosh(\kappa_S a)} = \frac{2mV}{\hbar^2}.$$

The left-hand side of this equation is a monotonically increasing function of KA ranging from 0 to ∞ as $\kappa_A$ ranges from 0 to ∞. Hence, it is evident that the preceding equation always has a solution for $\kappa_S$ and this solution is unique. In other words, there is only one symmetric energy eigenstate. Given $\kappa_S$, the energy eigenvalue E can then be computed as described above. Note that at a=0, the distance at which the two potential wells coincide, the preceding equation is still well behaved.

For the antisymmetric eigenstate, at x=−a one obtains for $\psi_A$ $$\frac{\partial \psi_A}{\partial x}\bigg|_{z=-a+\varepsilon} = \kappa_A A_A e^{-\kappa_A a}\coth(\kappa_A a), \frac{\partial \psi_A}{\partial x}\bigg|_{x=-a-\varepsilon} = \kappa_A A_A e^{-\kappa_A a} \text{ and}$$

$$\psi_A(-a) = -A_A e^{-\kappa_A a}.$$

Substituting these last three equations into the equation into the imposed conditions yields:

$$\frac{\hbar^2 \kappa_A}{2m}[\coth(\kappa_A a) + 1] = V.$$

which further yields $$\frac{\kappa_A e^{\kappa_A a}}{\sinh(\kappa_A a)} = \frac{2mV}{\hbar^2}.$$

and then becomes $$\frac{e^{\kappa_A a}}{a} = \frac{2mV}{\hbar^2} \text{ for } \kappa_A a \ll 1.$$

When the distance between the two potentials becomes sufficiently short, this equation will no longer have a solution. This indicates that the antisymmetric mode gets pushed into the continuum where it radiates away.

An exciton can be put into a superposition state. When $$a \gg \frac{1}{\kappa_S}$$

and the wave functions can be approximated as $$\psi_S = \frac{N}{\sqrt{2}}\left(e^{-\kappa|x-a|} + e^{-\kappa|x+a|}\right) \text{ and } \psi_A = \frac{N}{\sqrt{2}}\left(e^{-\kappa|x-a|} + e^{-\kappa|x+a|}\right),$$

where N is a normalization constant. Hence, a state vector with all the probability centered about x=−a is given by $$\psi_{-a} = \frac{1}{\sqrt{2}}(\psi_S - \psi_A) = Ne^{-\kappa|x+a|}$$

This initial state is a superposition of the symmetric and the antisymmetric state. As the two potentials approach each other at a rate where the energy eigenstates evolve adiabatically, the distance is decreased, and the energy of the antisymmetric state is pushed up until it is no longer a bound state. At this point, the antisymmetric state radiates away. If the exciton has not radiated away, the exciton is now in symmetric state $\psi_S$. As the distance between the potential wells increases the state evolves into the form from the equation where there is equal amplitude of finding the exciton in the well at x=−a and the well at x=+a. This is a one exciton entangled state.

This system exhibits the functionality of a beam-splitter. The beam-splitter is lossy in that half the time the exciton is radiated away. Nevertheless, if the exciton is not lost, it is now in a superposition of two states that can be well separated in position. Four such beam-splitters, which are collisions a, b, b', and c, can be used to make an exciton interferometer, as shown in FIGS. 1 and 2.

Figure 2:
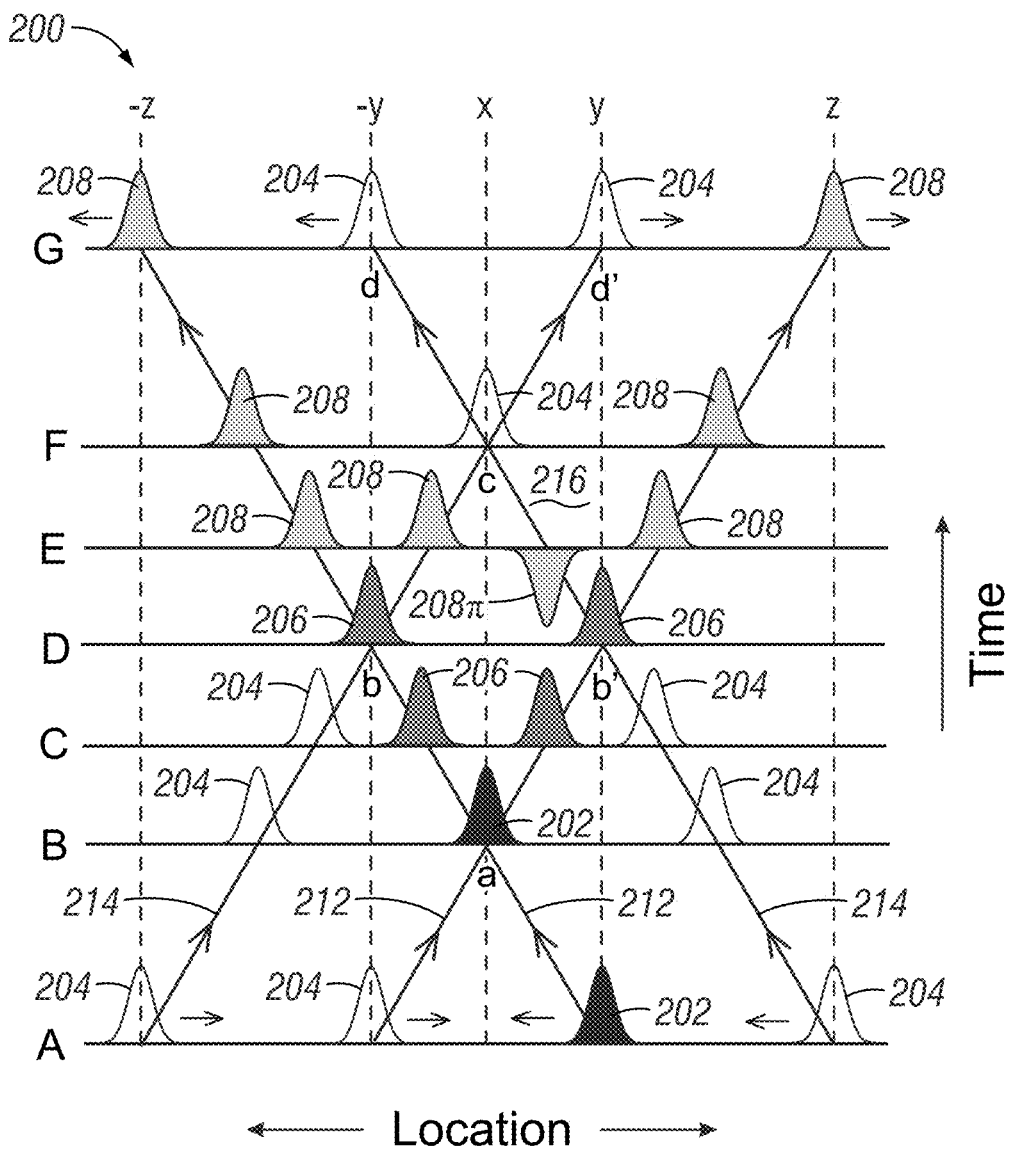
FIG. 2 shows a space-time diagram of colliding acoustic pulses implementing an exciton interferometer for the case of destructive interference.

The proposed interferometer scheme is shown in FIGS. 1 and 2. Initially one has four acoustic pulses propagating at time A of the figures. Only the solid black pulse 102/202 initially carries an exciton. The first collision a serves to prepare a symmetric entangled state. The second collisions b, b' serve to direct two acoustic waves carrying equal exciton amplitude toward each other:

$$\psi_S = \frac{N}{\sqrt{2}}\left(e^{-\kappa|x-a|} + e^{-\kappa|x+a|}\right).$$

An energy eigenstate has the time dependence $e^{-iEt/\hbar}$. Hence, the phase accumulated in traveling from b to c is $$\phi_1 \simeq \frac{1}{\hbar}\int_{t_a}^{t_b} E\,dt$$

Similarly, the phase accumulated in traveling from b' to c is $$\phi_2 \simeq \frac{1}{\hbar}\int_{t_a}^{t'_b} E\,dt$$

If the exciton energy along path b' to c differs from that along the path to b to c, a phase difference $$\phi = \phi_2 - \phi_1$$

is accumulated along path b' to c. Hence, arriving at c the wave function has evolved to:

$$\psi_e = \frac{N}{\sqrt{2}}\left(e^{i\phi}e^{-\kappa|x-a|} + e^{-\kappa|x+a|}\right).$$

This can be rewritten as:

$$\psi_c = \frac{Ne^{i\phi/2}}{\sqrt{2}}\left(e^{i\phi/2}e^{-\kappa|x-a|} + e^{-i\phi/2}e^{-\kappa|x+a|}\right) \text{ or}$$

$$\psi_c =$$

$$\frac{Ne^{i\phi/2}}{\sqrt{2}}\left\{\cos\left(\frac{\phi}{2}\right)\left[e^{-\kappa|x-a|} + e^{-i\phi/2}e^{-\kappa|x+a|}\right] + i\sin\left(\frac{\phi}{2}\right)\left[e^{-\kappa|x-a|} - e^{-i\phi/2}e^{-\kappa|x+a|}\right]\right\}.$$

This can be further written as $$\psi_c = -N_C e^{i\phi/2}\left[\cos\left(\frac{\phi}{2}\right)\psi_S + i\sin\left(\frac{\phi}{2}\right)\psi_A\right].$$

The antisymmetric component of the amplitude is not bound to the well and escapes. Hence, the state propagating towards d and d' is $$\psi_{d,d'} = N_{d,d'}\cos\left(\frac{\phi}{2}\right)\psi_S$$

and the probability, P, that the exciton arrives at d or d' is $$P_{d,d'} \propto \cos^2\left(\frac{\phi}{2}\right).$$

FIGS. 1 and 2 depict two cases of this, $\phi=0$ and $\phi=\pi$, respectively.

FIG. 1 shows a space-time diagram for a process of colliding acoustic pulses implemented with an exciton interferometer 100 for the case of constructive interference.

At time A, four surface acoustic wave pulses 112, 114 are launched in direction 110 from locations −z, −y, y, and z to collide with each other. The Gaussian hills 102, 104, 106, 108 are meant to represent the exciton wave function, Y. Solid black Gaussian hills 102 are those where the exciton amplitude is nonzero, and uncolored Gaussian hills 104 are those for which the exciton amplitude is zero (i.e., the negative of the potential well an exciton would be confined in). At time B, the two inner most acoustic pulses 112 have collided. At time C, i.e., during the collision, the energy of the antisymmetric component of the exciton wave function is raised into the continuum where it is lost from the potential well produced by the acoustic field. The amplitude remaining in the well 106 is that of the symmetric mode. Hence, as the acoustic pulses pass through each other, the exciton wave function has equal amplitude 106 in each of the emerging potential wells. At time D, second collisions b occur as the outermost pulses 114 collide with the resultant inner pulses. At time E, as with times B and C, the exciton amplitudes are further divided so that each pulse has equal exciton amplitude(s) 108, the value(s) of which is less than the value(s) of exciton amplitude(s) 106. At time F, the two innermost pulses merge at collision c. Because in FIG. 1 this is a merger of a symmetric exciton mode, no amplitude is lost in the pulse merger. At time G, a symmetric exciton mode emerges at space-time locations d, d'. The emergence results from the central pulse of the third collision c that occurred at time F. The emerging pulses have equal exciton amplitude(s) 108.

FIG. 2 shows a space-time diagram of colliding acoustic pulses implementing an exciton interferometer 200 for the case of destructive interference. The process shown using the interferometer 200 in FIG. 2 is similar to the process of using the interferometer 100 FIG. 1, with like numerals representing like elements (e.g., medium 116 is identical to medium 216). The process differs on the path from b' to c, where the amplitude of the exciton accumulates a phase shift of r as represented by the inverted Gaussian 208π. When the two innermost pulses emerging from the second collisions b, b' merge at c, the innermost pulses do so as an antisymmetric mode with amplitudes 208, 208π. These amplitude(s) are lost to the well during collision c, at time F. The two inner most wells remain empty and thus have zero amplitude 204 from time G onward. The phase shift π can come about by the exciton interacting with its surroundings in a way that temporarily changes its potential energy.

Excitons emerging at space-time locations d, d' can be used directly for quantum computations and/or bound to other particles of matter and/or quasiparticles to later be used for quantum computations. For example, an exciton emerging from an acoustic guiding process of FIG. 1 can be used by an excitonic circuit in a quantum computer, see infra. The present disclosure also contemplates the exciton can first be bound to a photon or a phonon to form an exciton-polariton and an exciton-phonon coupling, respectively, see infra.

Wires, Circuits, Gates, and Quantum Computing

Quantum algorithms enable the speed-up of computation tasks such as, but not limited to, factoring and sorting. These computations may be performed by an excitonic quantum computer. The excitonic quantum computer can be made from exciton coherence wires, circuits, and gates, such as those described in co-pending, co-owned U.S. Pre-Grant Pub. No. 2019/0048036.

For example, exciton wires may be formed when a series of chromophores are held within the architecture so that when a first chromophore, the "input chromophore," is excited and emits an exciton, the exciton passes, without loss of energy if sufficiently close, to a second chromophore. That chromophore may then pass the exciton to a third chromophore, and so on down a line of chromophores in a wave-like manner. The wires may be straight or branched and may be shaped to go in any direction within the architecture. The architecture may contain one or more wires. Depending on the architecture system used, the wires may be formed along a single nucleotide brick, such as in using the scaffold strand of nucleotide origami, or multiple bricks may comprise the wire, such as in molecular canvases.

Figure 3A:
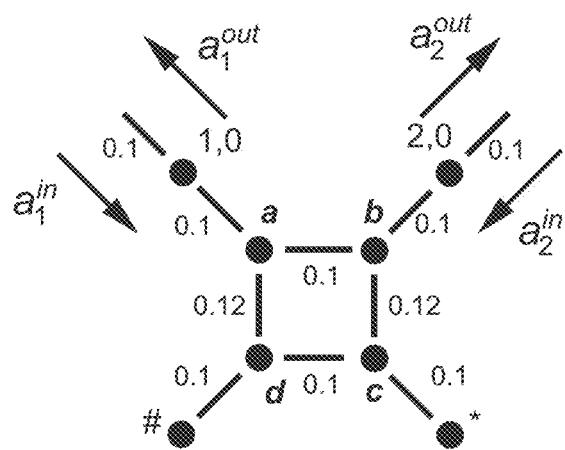
FIGS. 3A-3C are collectively a schematic representation of excitonic quantum switches and gates that form the basis of quantum computing that include phase gates (FIG. 3A), basis-changing gate (FIG. 3B), and a controlled basis change gate (FIG. 3C). The dots represent the chromophores.
Figure 3B:
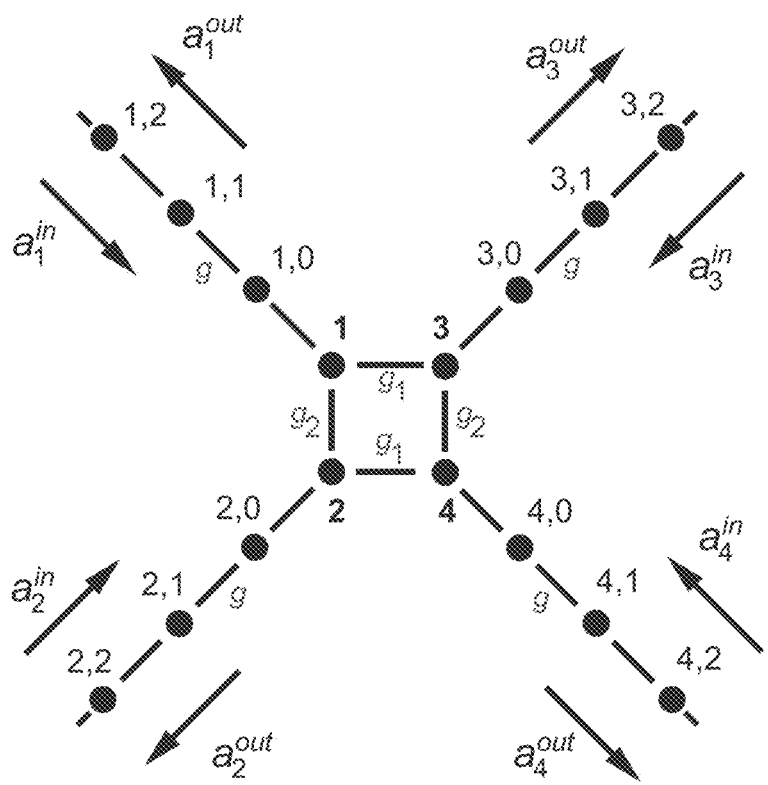

When two or more wires are brought sufficiently close to each other such that they are nanospaced, the exciton may transfer from one wire to the other. By controlling this transfer, it is possible to build quantum circuits and gates. Two basic gates are needed for universal quantum computing: basis-change gates (FIG. 3B) and phase-shift gates (FIG. 3A). The basis-change gate functions as a signal divider in classical computer. As the exciton propagates down one wire and if another wire is sufficient close, the exciton will delocalize and enter a superposition state where it resides on both wires.

The phase-shift gate alters the exciton's phase by controlling the distance the exciton travels along the two wires. As shown in FIG. 3A, this may be done by first bringing two wires within nanospace from each other and then bending one or more wire away from the other in order to create two different lengths of the wires before bringing the wires close again.

Figure 3C:
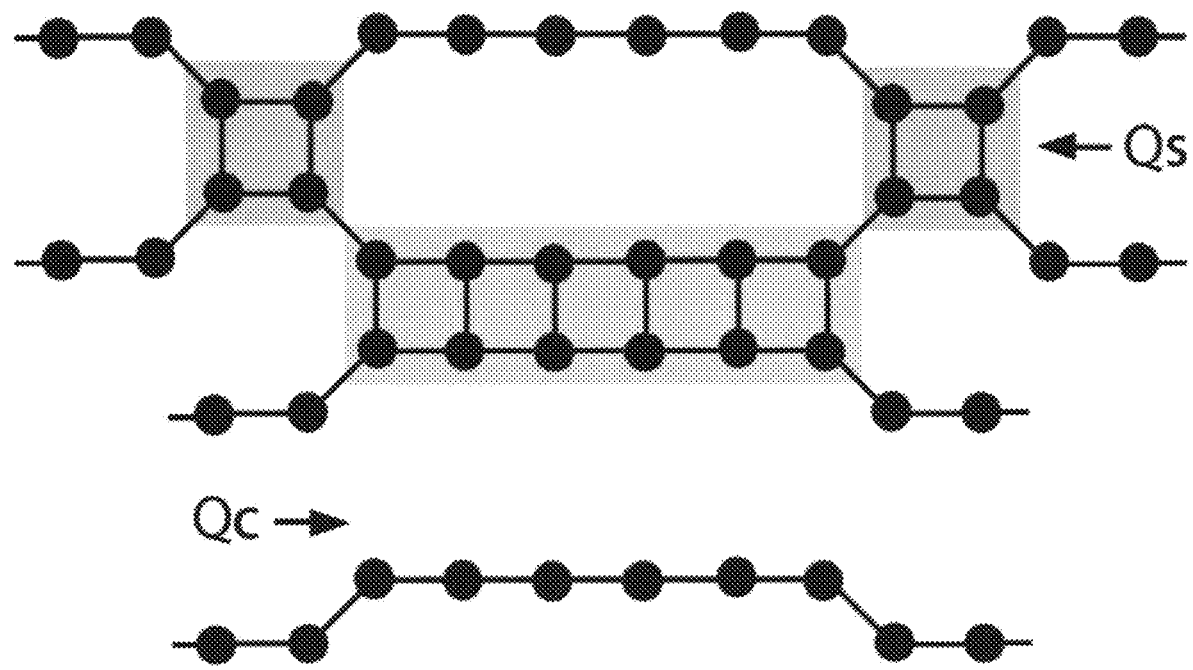

However, with just these two types of gates, quantum computing does not outperform classical computing. A third kind of gate, the controlled basis-change gate (FIG. 3C) enables the entanglement of many-exciton states so that a network of quantum gates acts as if it is performing many different computations simultaneously. An exemplary controlled basis-change gate may be made from two basis-change gates and a phase-shift gate, with the phase-shift gate between the two basis-change gates. The controlled basis-change gate relies on the interaction between two excitons. When two excitons reside on neighboring chromophores, they feel each other's presence just like two electrons will feel each other's Coulomb repulsion when they are brought close together. The two-exciton interaction arises from static Coulomb interactions between molecules and is stronger when the molecules have an asymmetric molecular structure as compared with those with a symmetrical molecular structure. Asymmetric molecules possess a permanent electric dipole which changes sign when the molecule is excited from the ground state to the excited state. The static Coulomb interaction, in this case is a dipole-dipole interaction which, when both chromophores are excited (the two-exciton case), differs in sign from the case when only one chromophore is excited (the one-exciton case). Due to the static Coulomb interactions between chromophores, one exciton will accumulate extra phase in the presence of the other exciton. As a result, the presence or absence of one exciton can control how the other exciton moves through a basis change gate.

Additionally, additional gates may be incorporated into the architecture, such as, but not limited to, Hadamard gates, momentum switches, and Cθ gates (see Childs et al., *Universal Computation by Multiparticle Quantum Walk*, Science, 339, 791-94 (2013), herein incorporated by reference).

With reference to FIGS. 1 and 2, it is to be understood that controlling the distance between wells and/or controlling phase-shift gates so as only to have a finite set of phase angles can impact the probability that an exciton emerges at locations d, d' within interferometers 100, 200. By controlling the position and optical transition energies of the various gates, a set of gates, or a quantum circuit can be achieved.

The wires, gates, and switches as discussed above can be joined together to answer questions that benefit from quantum algorithms such as, but not limited to, sorting, factoring, and database searching. To initialize the system, input chromophores could be excited using the acoustic interferometers described above with the proper wavelength of acoustic pulse in such a manner that only the desired subset of chromophores is excited when the system is hit with an initializing pulse of sound.

After initializing, the excitons then propagate from chromophore to chromophore along the wires into the various gates. The various gates then calculate the answer, such as a sorted list or mathematical problem. The output, or readout, can be done by using fluorescent reporter dyes to which the answer of the quantum computation is delivered by ordinary Förster/fluorescence resonance energy transfer ("FRET"). FRET describes energy transfer between two light-sensitive molecules. A donor chromophore, initially in its electronic excited state, may transfer energy to an acceptor chromophore through nonradiative dipole-dipole coupling. The efficiency of this energy transfer is inversely proportional to the sixth power of the distance between donor and acceptor, making FRET sensitive to small changes in distance.

Although this would be particularly beneficial for problems in which the output has a limited number of bits, these problems have applications in aeronautics, earth and space sciences, and space exploration, among other fields of research. Additionally, in these systems it has been demonstrated that quantum coherence and electronic coherence are observed at room temperature in a wet and noisy environment, which is an environment that is normally hostile to quantum coherence.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| | List of Reference Characters |
|---|---|
| 100 | exciton-based interferometer (constructive interference) |
| 102 | space-time location(s) of acoustic pulse with non-zero exciton amplitude (represented by 100% black Gaussian) |
| 104 | space-time location(s) of acoustic pulse with zero exciton amplitude |
| 106 | space-time location(s) of acoustic pulse with reduced exciton amplitude (represented by 50% black Gaussian) |
| 108 | space-time location(s) of acoustic pulse with further reduced exciton amplitude (represented with 25% black Gaussian) |
| 110 | direction of travel for acoustic pulses |
| 112 | inner acoustic pulse(s) |
| 114 | outer acoustic pulse(s) |
| 116 | elastic medium having inertia (e.g., liquid/gas) |
| 200 | exciton based interferometer (destructive interference) |
| 202 | space-time location(s) of acoustic pulse with non-zero exciton amplitude (represented by 100% black Gaussian) |
| 204 | space-time location(s) of acoustic pulse with zero exciton amplitude |
| 206 | space-time location(s) of acoustic pulse with reduced exciton amplitude (represented by 50% black Gaussian) |
| 208 | space-time location(s) of acoustic pulse with further reduced exciton amplitude (represented with 25% black Gaussian) |
| 208π | space-time location of acoustic pulse with phase shift |
| 210 | direction of travel for acoustic pulses |
| 212 | inner acoustic pulse(s) |
| 214 | outer acoustic pulse(s) |
| 216 | elastic medium having inertia (e.g., liquid/gas) |
| A | space-time plane when acoustic pulses are launched |
| B | space-time plane during first collision |
| C | space-time plane between first and second collisions |
| D | space-time plane during second collisions |
| E | space-time plane between second collisions and third collision |
| F | space-time plane during third collision |
| G | space-time plane subsequent to all collisions of acoustic pulses |
| a | first collision |

TABLE 1-continued

List of Reference Characters

| | |
|---|---|
| b, b' | second collisions |
| c | third collision |
| d, d' | post collisions |
| x | central location |
| y, −y | locations of second collisions and/or launching location of inner pulses |
| z, −z | launching locations of outer pulses and/or terminating location of inner pulses |
| π | phase shift |

What is claimed is:

1. A method of manipulating a Wannier-Mott exciton comprising:
  launching a plurality of inner wave pulses of an elastic medium into one another to cause a first collision;
  during said first collision, raising an energy of an antisymmetric component of an exciton wave function into a continuum such that the energy is lost from a potential well produced by the elastic medium;
  launching a plurality of outer waves pulses toward one another to cause:
    second collisions between the plurality of outer waves and resulting waves from the first collision;
    a third collision between a subset of waves resulting from the second collisions; and
    a probability the Wannier-Mott exciton arrives at one or more predetermined locations based on a phase shift that can occur at a time between the second collisions and third collision; and
  detecting whether the Wannier-Mott exciton arrived at the one or more predetermined locations and/or collecting the Wannier-Mott exciton for quantum computation(s).

2. The method of claim 1 further comprising repeating the steps of the method until the third collision results in a merger where a symmetric exciton mode emerges with no amplitude lost.

3. The method of claim 1 further comprising controlling the phase shift and/or a distance between two wells to said probability.

4. The method of claim 1 further comprising binding the Wannier-Mott exciton with visible light to form an exciton-polariton or with sound waves to form an exciton-phonon.

5. The method of claim 1 further comprising well separating the Wannier-Mott exciton in position.

6. The method of claim 1, wherein:
  the elastic medium comprises an acoustic field; and
  the plurality of inner wave pulses and the plurality of outer wave pulses are formed from using ultrasound.

7. The method of claim 1, wherein the second collisions comprise two collisions substantially equidistantly spaced from a central location of an interferometer used to carry out the method and the first collision and the third collision occur at said central location.

8. The method of claim 1, wherein an exciton amplitude of a first inner wave pulse selected from the plurality of wave pulses is non-zero and an exciton amplitude of a second wave pulse selected from the plurality of wave pulses equals zero.

9. The method of claim 1, wherein the plurality of inner wave pulses and/or the plurality of outer wave pulses are launched from the same source and/or have a substantially similar or identical frequency.

10. The method of claim 1, further comprising extracting information from interference by measuring a physical characteristic of sound selected from the group consisting of:
  velocity,
  wavelength,
  absorption,
  impedance, and
  temperature.

* * * * *